2,980,857
Patented Apr. 18, 1961

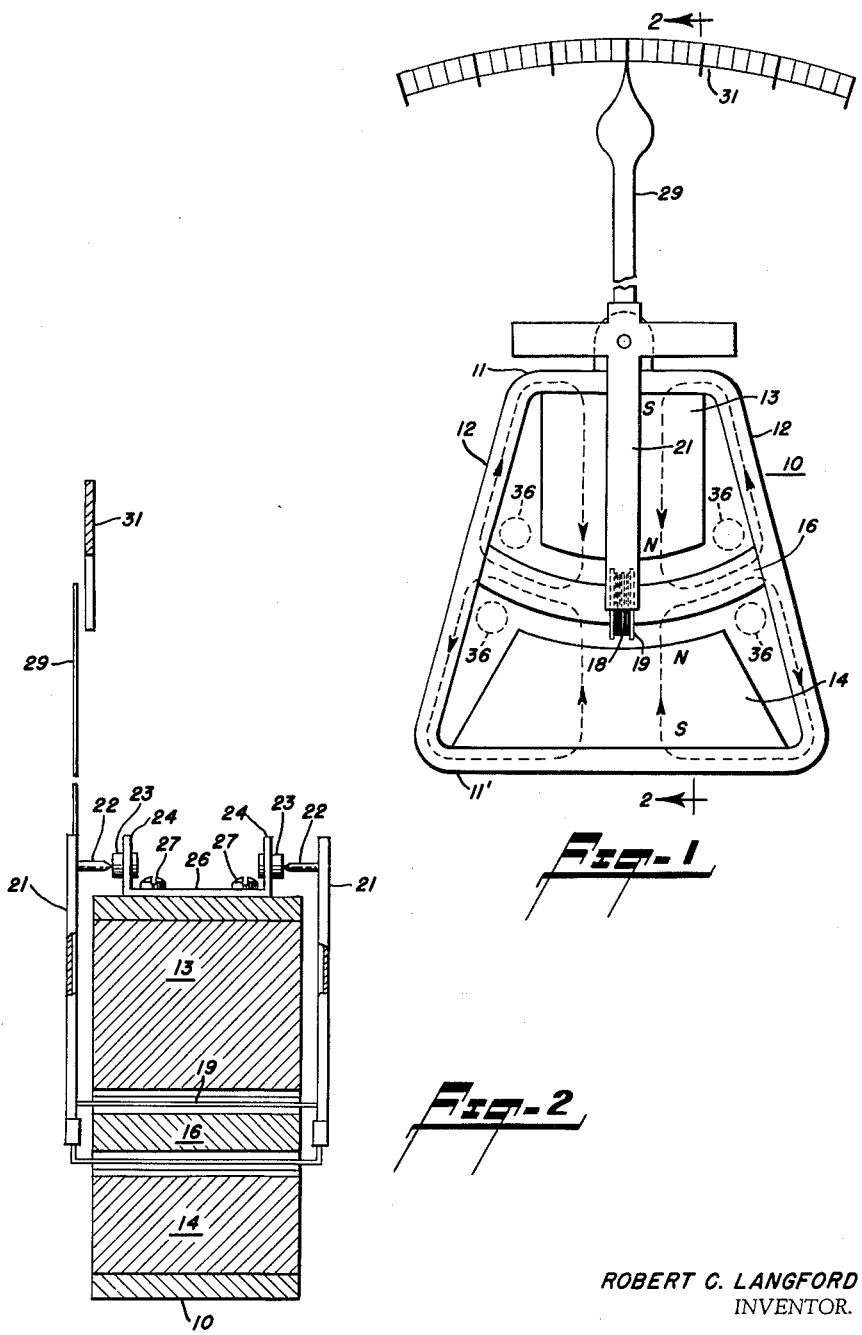
April 18, 1961     R. C. LANGFORD     2,980,857
DUAL MAGNET ELECTRICAL INSTRUMENT
Filed Dec. 30, 1958
ROBERT C. LANGFORD
INVENTOR.

2,980,857

DUAL MAGNET ELECTRICAL INSTRUMENT

Robert C. Langford, West Orange, N.J., assignor to Daystrom, Incorporated, Murray Hill, N.J., a corporation of New Jersey Filed Dec. 30, 1958, Ser. No. 783,934

2 Claims. (Cl. 324—150)

This invention relates to an electrical instrument and more particularly to a permanent magnet, movable coil instrument having an improved magnetic system employing a pair of permanent magnets therein.

The invention contemplates the provision of an instrument mechanism of high sensitivity and high torque. The instrument magnetic system includes a soft-iron yoke which forms an enclosure, and a pair of permanent magnets disposed within the yoke. The yoke forms a shield for the magnets whereby only a low external magnetic field is produced by the instrument. Likewise, the magnets are shielded from stray external magnetic fields. This self-shielding arrangement results in small space and low weight requirements for the instrument, which factors are of particular importance in aircraft use.

An arcuate soft-iron core is mounted between a first pair of oppositely disposed legs of the yoke, while the two permanent magnets are mounted on a second pair of diametrically opposite legs of the yoke in spaced relation with the core to form a magnetic flux gap between each magnet and the core. In this manner, the entire magnetic energy of each permanent magnet is concentrated in a single flux gap, and by using two magnets, two such flux gaps of high magnetic energy concentration are provided. A wire wound movable coil is pivotably mounted for rotation in the flux gaps in response to current conducted to the coil. One side of the wire turns operates in the one flux gap while the other side operates in the other flux gap. The magnets are oriented in an opposed relation such that each side of the coil contributes a torque in the same direction, in response to coil current. The coil is mounted for rotation about a pivot axis displaced from the coil, whereby the weight of the moving coil may therefore, be utilized to balance a long pointer with or without the addition of counter-balance weights.

The width of the core is relatively small, since the core size need be only great enough to adequately carry the magnetic flux for the two magnets. A relatively flat coil may be used, therefore, in which the end turns are of a minimum length. A maximum torque arrangement results since the torque of the mechanism is equal to the sum of the movements of the forces on each side of the coil multiplied by the respective distance of the coil sides from the pivot point of the coil. Since much of the coil length is located in a flux gap rather than in end turns, a most efficient distribution of coil resistance is obtained.

An object of this invention is the provision of a high torque electrical instrument employing a pair of magnets in a unitary magnetic structure.

An object of this invention is the provision of an electrical instrument of the self-shielding type which has high torque and which is particularly suited for aircraft use.

An object of this invention is the provision of an electrical indicating instrument in which the weight of the wire wound moving coil balances the weight of the pointer with or without additional counter-balance weights.

An object of this invention is the provision of an improved magnetic structure for high torque, high efficiency, electrical instruments which includes a pair of magnets spaced from an arcuate core and forming a pair of generally concentric arcuate flux gaps of different radii within which a movable coil is pivotally located.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is a front view of the coil and magnetic structure in an electrical instrument embodying the invention; and Figure 2 is a sectional view taken on line 2—2 of Figure 1.

Reference is made to the drawings wherein there is shown a magnetic structure assembly comprising a soft-iron yoke 10 forming an enclosure. Although the precise configuration of the yoke forms no part of this invention, I provide generally parallel upper and lower leg portions 11 and 11', respectively, interconnected by inclined uprights 12, 12. Permanent magnets 13 and 14, of simple shape, and magnetized as indicated, for example, by the polar markings N and S, are suitably secured to the flat parallel extending inner faces of the yoke. The magnets are oriented in an opposed relation wherein like polarity polar surfaces are attached to the yoke. An arcuate-shaped core 16 extends between the inclined uprights 12, 12 intermediate the ends thereof, and is spaced from the convex and concave polar surfaces of the magnets 13 and 14, respectively, to form arcuate flux gaps between the core and magnets within which opposite sides of a movable coil 18 operate.

The coil 18 may be wound upon a coil frame 19, made of aluminum or other suitable non-magnetic material, and surrounding the core 16. The coil and frame are supported by a pair of brackets 21, 21 of U-shaped cross-section for strength. Pivots 22, 22 are secured to the brackets adjacent the upper ends thereof, which pivots are rotatably supported in conventional jewel bearing assemblies 23, 23. Front and rear bridges 24, 24, comprising parallel upright arms of a U-shaped bracket 26 which is secured to the top of the yoke 10 by tap screws 27, support the said jewel bearing assemblies. A pointer 29 extends upwardly from the front coil supporting bracket 21 and cooperates with a scale on a scale plate 31 suitably secured to the instrument by means not shown in the drawings. For simplicity, the conventional spiral springs and associated spring abutments for returning the coil to normal zero current position, and for conducting current to the coil, have been omitted from the drawings, in addition to the instrument case and other elements not essential to an understanding of my invention.

With current flow through the wire-wound moving coil 18 both sides of the coil in the flux gaps contribute to a torque on the said off-center pivoted coil. Unlike many prior art mechanisms wherein either no force is developed on one side of the coil, or the forces on the coil sides are in opposite directions, the forces on the coil 18 of my invention act in the same direction. Each side of the coil contributes to the overall torque of the said pivoted coil, which torque equals the sum of the products of the forces on the coil sides multiplied by their distances from the pivot axis. In conventional mechanisms of either the center or end pivoted coil types, the torque on the coil is proportional to the area enclosed by the moving coil, regardless of the coil configurations. In high torque mechanisms where there is, in general, a large magnet, this prior art construction results in a fairly large amount of wasted copper in the moving coil on the end turns. With my novel construction, the moving coil 18 surrounds the soft-iron flux carrying core 16, the width of which is merely enough to carry the flux to the two opposed internal magnets 13 and 14. Consequently, the wasted copper in the coil end turns is small, since the end turns are of a minimum length.

With this minimum width of coil, the resistance of the moving coil is also a minimum. In other words the resistance of the coil is considerably more efficiently distributed than in conventional instrument mechanisms. For this reason, then, the ratio of the effective torque to the resistance of the moving coil is at a maximum with the construction of my invention. In addition, the weight, and consequently the inertia of the moving system, is small since that part of the moving coil which does not contribute to the production of torque is at a minimum.

When the coil 18 is wound upon a frame 19, as illustrated, for purposes of damping, as will be well understood by those skilled in this art, optimum conditions prevail for maximum conductance for the frame since the ends of the frame are also of a minimum length.

With the off-center pivoted moving coil arrangement of my invention wherein the pivot axis of the moving coil is displaced from the coil, the weight of the coil may be used to counter-balance the long pointer 29 commonly used in aircraft instrument construction with, or without, the addition of counter-balance weights. For this reason, the total weight of the moving coil system on the pivots and jewels is a minimum and, therefore, the friction torque is low.

It will be noted that the yoke 10 encloses, or surrounds, the magnets 13 and 14 to provide a self-shielding type mechanism whereby the stray magnetic field produced by the instrument is low and, conversely, the interaction of external magnetic fields on the instrument is also low. This self-shielding feature is of particular importance in aircraft use where instruments of minimum weight and size are required.

In the construction illustrated, the sides of the magnets 13 and 14 are spaced from the upright legs 12, 12 of the yoke 10 to provide space for charging fixture conductors of a magnet charger, which conductors are shown in broken line in Figure 1 and designated 36. By passing a charging current through the conductors 36 in the proper directions, the magnets 13 and 14 may be charged to the desired strength in the assembled magnetic structure.

Having now described my invention in detail in accordance with the patent statutes, various other changes and modifications will suggest themselves to those skilled in this art. It is intended that such changes and modifications shall fall within the spirit and scope of the invention as recited in the following claims.

I claim:

1. A meter movement comprising a soft-iron yoke of substantially uniform, rectangular cross-sectional area and in the form of a closed loop having a first leg that is shorter than an opposed second leg and diverging side legs joining the first and second legs; a first permanent magnet of substantially uniform cross-sectional area normal to the magnetic axis, said magnet having one polar surface abutting the inner wall of said first yoke leg and the other polar surface being convex; a second permanent magnet having one polar surface abutting the inner wall of the second yoke leg and the other polar surface being concave and spaced from the similarly polarized convex surface of the said first magnet, said second magnet having tapered side walls diverging at an angle greater than that of the yoke side legs; an arcuate core of magnetic material extending between the yoke side legs and positioned between the proximate polar surfaces of the said magnets to form first and second arcuate flux gaps; axially-aligned bearings carried by the said first yoke leg and disposed on an axis spaced beyond the plane of the outer wall thereof; a movable coil having sides passing through the respective first and second flux gaps; and means mounting the movable coil for pivotal rotation in said bearings.

2. The invention as recited in claim 1 wherein the axial spacing between the said bearings is less than the width of the yoke.

References Cited in the file of this patent

UNITED STATES PATENTS

| | | |
|---|---|---|
| 1,163,070 | Day | Dec. 7, 1915 |
| 2,076,879 | Carton | Apr. 13, 1937 |
| 2,508,380 | Freedman | May 23, 1950 |
| 2,508,439 | Young | May 23, 1950 |
| 2,833,989 | Nylander | May 6, 1958 |
| 2,840,782 | Ammon | June 24, 1958 |

FOREIGN PATENTS

| | | |
|---|---|---|
| 441,908 | Great Britain | Jan. 29, 1936 |